United States Patent Office 3,053,793
Patented Sept. 11, 1962

3,053,793
CURED REACTION PRODUCT OF A XYLENE-FORMALDEHYDE RESIN AND A PHENOL-FORMALDEHYDE CONDENSATE, AND PROCESS FOR PREPARING SAME
Minoru Imoto and Ching Yun Huang, Osaka, Japan, assignors to Fine Organics, Inc., New York, N.Y., a corporation of New York
No Drawing. Filed Oct. 23, 1958, Ser. No. 769,073
7 Claims. (Cl. 260—43)

This invention comprises the method of manufacturing a synthetic resin, the characteristics of which consist in the following. Mixing and kneading 1 mol. of novolac resin or its intermediates, 0.1–2 mol. of xylene formaldehyde resin and 0.1–0.2% of xylene sulfonic acid and then curing the mixture by heating it under increased pressure or atmospheric pressure. The invention aims at offering the method of manufacturing a synthetic resin, good in electrical properties because of the existence of less OH radicals and cheap in price because of smaller use of expensive phenol. When phenol and formaldehyde are reacted in the presence of an acidic catalyst, a thermoplastic phenol-formaldehyde resin, so-called novolac resin, is produced.

These novolac resins are generally thermoplastic and cannot be cured by elevated temperature, but they are thermoset by the use of hexamethylenetetramine as bridging agent.

This invention concerns the use of a new bridging agent not yet shown in the conventional phenolic resin manufacture, to wit: xylene formaldehyde resin, when novolac resin is heat-cured.

Xylene formaldehyde resin is a resin produced by the reaction of xylene with formaldehyde or paraformaldehyde in the presence of an acidic catalyst, which combines xylene rings with $-CH_2-$, $-CH_2OCH_2-$, $-CH_2O(CH_2O)_n-$, $-CH_2-$, and keeps 3—40% of $-CH_2OH$ in the resin molecules.

When 1 mol. of novolac resin and 0.1–0.2 mol. of xylene formaldehyde resin are heat-cured in the presence of an acidic catalyst at the temperature of 100–180° C. the linear chain $-CH_2OCH_2-$, $-CH_2O(CH_2O)_n-$, $-CH_2-$, of xylene formaldehyde resin opens and at the same time the radical $CH_2OH$ contained in xylene formaldehyde resin reacts with unreacted position of phenol in novolac resin and plays its part as bridging agent in the thermosetting of novolac resin. The use of acidic xylene formaldehyde resin in the heat-cure of novolac resin is not only a new procedure not yet seen in conventional practice but also enables us to adjust freely the contents of the active construction as the bridging agent contained in xylene formaldehyde resin, that is, ether combination ($-CH_2OCH_2-$), acetal combination ($-CH_2O(CH_2O)_n-CH_2-$) and methylol radical ($-CH_2OH$) which links the xylene ring, when we manufacture xylene formaldehyde resins, so that the same resin contains some inactive resin content as bridging agent, such as a resin having methylene linkage ($-CH_2-$) between xylene ring. It never causes inhibitive action to the curing of the resulted resin through bridging, but serves as fillers.

Hexamethylenetetramine, conventional bridging agent, is comparatively high in price and the optimum quantity to be used is 10–20% of novolac resin. In case more quantity is used, it does not serve as filler but produces immense quantity of ammonia when the resin is heat-cured and degrades the properties of the resin owing to the fact that it contains many minute foams.

On the other hand, xylene formaldehyde resin acts as curing agent as well as bridging agent and is absolutely necessary.

Besides, in case considerable excess beyond optimum quantity is used, xylene formaldehyde resin, when heated, turns into methylene resin, the molecular weight of which is several or several ten times higher than it because ether linkage, acetal linkage and methylol radical cause condensation reaction between xylene formaldehyde resin molecules.

Thus the resin which contains methylene resin not only serves as filler but also increases strong insulation properties against high cycle electrical wave as polystyrene, not seen in Bakelite. Moulded materials of novolac resin using optimum quantity of xylene formaldehyde resin as bridging agent shows far superior electrical insulation properties to the first-grade material of conventional phenolic resin shown in JIS specifications.

Especially in case of the heat-cured resin bridged by xylene formaldehyde resin, the number of phenolic acid groups contained in the cured molecules becomes very small so that strong alkali-resistant resin is finally obtained.

The comparison between the above-mentioned resins and the novolac resins cured by hexamethylenetetramine shown in JIS specifications, in their physical and chemical properties, is shown below.

As is shown above, if we use low-cost xylene formaldehyde resin instead of conventional hexamethylenetetramine as bridging and curing agent for novolac resin, different types of bridging and curing action occur and at the same time we obtain resins which show excellent physical and chemical characteristics not seen in ordinary Bakelites.

Two-ring type or even three-ring type synthetic intermediates of novolac resin can also be heat-cured by xylene formaldehyde resin in the same way.

As catalyst, besides xylene sulfonic acid, organic or inorganic acids such as para-toluene sulfonic acid, sulfuric acid, hydrochloric acid, perchloric acid, boron trifluoride or its ether salts, show excellent curing actions.

*Example I*

When 1 mol. of novolac resin (molecular weight 350), 1.5 mol. of xylene formaldehyde resin (molecular weight 250, oxygen content 14.0%) and 0.1% of meta-xylene sulfonic acid are well mixed, kneaded and then heated at 180° C. heat-curing occurs. Thus, after 20 minutes, an infusible and cured resin, approximately 90% in quantity, is obtained, when extraction is done.

*Example II*

When 1 mol. of novolac resin (molecular weight 350), 2 mol. of xylene formaldehyde resin (molecular weight 300, oxygen content 10.7%) and 0.1% of xylene sulfonic acid are well mixed, kneaded and then heated at 170° C. for 30 minutes to be heat-cured, a completely infusible and cured moulded material is obtained.

*Example III*

When 1 mol. of novolac resin (molecular weight 450), 0.5 mol. of xylene formaldehyde resin (molecular weight 280, oxygen content 16.8%) and 0.2% of xylene sulfonic acid are well mixed and heat-cured at 160° C. for 30 minutes, an infusible and cured resin, 90% in quantity, is obtained.

*Example IV*

When 1 mol. of novolac resin (molecular weight 330), 1.6 mol. of xylene formaldehyde resin (molecular weight 230, oxygen content 16.8%), 0.1% of xylene sulfonic acid and 700 g. of wood powder are mixed well and kneaded with rolls below 80° C. and then heated at 170° C. under the pressure of 200 to 400 kg./cm.$^2$, moulding material is obtained.

Example V

When 1 mol. (200 g.) of O,O'-dihydroxydiphenyl methane, intermediate of novolac resin, 0.8 mol. of xylene formaldehyde resin (molecular weight 250, oxygen content 14.0%) and 0.1% of xylene sulfonic acid are mixed well and then heated at 120° C. for 30 minutes, a completely insoluble and infusible resin is obtained.

This invention, as was described above, reducing the cost by less use of phenolic acid and elevating the electrical properties by decreasing the number of OH radical, offers a good method of manufacturing a synthetic resin bridged and heat-cured.

We claim:

1. The method of manufacturing a resinous product which comprises reacting a member of the group consisting of a novolac resin and O,O'-dihydroxy-diphenyl methane with a xylene-formaldehyde resin.

2. The method which comprises mixing one mole of a member of the group consisting of a novolac resin and O,O'-dihydroxy-diphenyl methane, 0.1 to 2 moles of a xylene-formaldehyde resin, and 0.1 to 0.3% of an acidic catalyst, kneading the mixtures, and then curing the same by heat.

3. Method in accordance with claim 2 wherein the heating takes place under increased pressure.

4. A resinous product comprising the cured reaction product formed by the interaction of a member of the group consisting of a novolac resin and O,O'-dihydroxydiphenyl methane with a xylene-formaldehyde resin.

5. A resinous product comprising the cured reaction product of about one mole of a member of the group consisting of a novolac resin and O,O'-dihydroxy-diphenyl methane with about 0.1 to 2 moles of a xylene-formaldehyde resin.

6. The method of manufacturing a resinous product which comprises reacting at elevated temperature one mole of a novolac resin with about 0.1 to 2 moles of a xylene-formaldehyde resin.

7. A resinous product comprising the cured reaction product of one mole of a novolac resin with about 0.1 to 2 moles of a xylene-formaldehyde resin.

References Cited in the file of this patent

FOREIGN PATENTS

| | | |
|---|---|---|
| 541,771 | Canada | June 4, 1957 |
| B22,418 | Germany | Feb. 9, 1956 |